US 9,485,514 B2

(12) United States Patent
Labosco et al.

(10) Patent No.: US 9,485,514 B2
(45) Date of Patent: Nov. 1, 2016

(54) SYSTEM AND METHOD FOR COMPRESSING VIDEO AND REFORMATTING THE COMPRESSED VIDEO TO SIMULATE UNCOMPRESSED VIDEO WITH A LOWER BANDWIDTH

(71) Applicant: Crestron Electronics, Inc., Rockleigh, NJ (US)

(72) Inventors: Mark Labosco, New City, NY (US); Dario Pagano, New Providence, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/678,563

(22) Filed: Apr. 3, 2015

(65) Prior Publication Data
US 2015/0288919 A1 Oct. 8, 2015

Related U.S. Application Data

(60) Provisional application No. 61/974,687, filed on Apr. 3, 2014.

(51) Int. Cl.
| | |
|---|---|
| *H04N 7/01* | (2006.01) |
| *H04N 19/44* | (2014.01) |
| *H04N 7/12* | (2006.01) |
| *G09G 5/00* | (2006.01) |

(52) U.S. Cl.
CPC .............. *H04N 19/44* (2014.11); *G09G 5/008* (2013.01); *G09G 5/005* (2013.01); *G09G 2340/02* (2013.01); *G09G 2350/00* (2013.01); *G09G 2360/02* (2013.01); *G09G 2370/042* (2013.01); *H04N 7/12* (2013.01)

(58) Field of Classification Search
USPC ........................ 348/445, 441, 448, 458, 459
See application file for complete search history.

(56) References Cited

U.S. PATENT DOCUMENTS

4,963,963 A * 10/1990 Dorman .................... H04N 5/33
250/332
5,828,403 A * 10/1998 DeRodeff .......... H04N 7/17309
348/E7.07

(Continued)

OTHER PUBLICATIONS

Tim Borer, Open Technology Video Compression for Production and Post Production, BBC Research White Paper WHP 159, Nov. 2007, 8 pgs, British Broadcasting Corporation.

(Continued)

*Primary Examiner* — Paulos M Natnael
(74) *Attorney, Agent, or Firm* — Crestron Electronics Inc.

(57) ABSTRACT

Presented is a video distribution system that includes a transmitter that receives an uncompressed source video signal and includes a compressor for compressing the uncompressed source video signal into a compressed video signal having a bandwidth lower than the bandwidth of the uncompressed source video signal, a reformatter configured for reformatting the compressed video signal to simulate an uncompressed video signal having a bandwidth lower than the bandwidth of the uncompressed video signal. The video distribution system also includes a receiver that receives the compressed video signal that simulates an uncompressed video signal and includes a decompressor configured for decompressing the compressed video signal that simulates an uncompressed video signal into a decompressed video signal, and output port configured for transmitting the decompressed video signal to a display.

18 Claims, 10 Drawing Sheets

(56) References Cited

U.S. PATENT DOCUMENTS

| | | | | |
|---|---|---|---|---|
| 5,838,823 | A * | 11/1998 | Ancessi | G06T 9/008 358/1.9 |
| 5,867,484 | A * | 2/1999 | Shaunfield | H04J 3/1611 348/E7.053 |
| 6,356,662 | B1 * | 3/2002 | Tsai | H04N 19/37 375/240.1 |
| 7,502,470 | B2 * | 3/2009 | Hanko | G06F 21/10 380/200 |
| 7,702,925 | B2 * | 4/2010 | Northcutt | H04L 25/03159 705/59 |
| 7,849,393 | B1 * | 12/2010 | Hendricks | H04N 5/4401 715/203 |
| 2002/0163598 | A1 * | 11/2002 | Pasqualino | H03L 7/085 348/725 |
| 2006/0294559 | A1 * | 12/2006 | Ansari | H04N 7/163 725/100 |
| 2007/0101398 | A1 * | 5/2007 | Islam | G02B 26/0808 725/151 |
| 2010/0329338 | A1 * | 12/2010 | Coban | H04N 19/70 375/240.15 |
| 2011/0030025 | A1 * | 2/2011 | Bertonis | H04N 21/43637 725/118 |

OTHER PUBLICATIONS

Numedia Technology, DIRAC-PRO Advanced Wavelet Compression Product range Every Compression Counts Brochure, Hampshire UK.

* cited by examiner

SYSTEM AND METHOD FOR COMPRESSING VIDEO AND REFORMATTING THE COMPRESSED VIDEO TO SIMULATE UNCOMPRESSED VIDEO WITH A LOWER BANDWIDTH

BACKGROUND OF THE INVENTION

1. Technical Field

The present invention relates generally to video compression and more particularly to a system and method for compressing video from a video source and then reformatting the compressed video to mimic or simulate uncompressed video with a lower bandwidth than the uncompressed source video and transmitting the compressed video via a video infrastructure that is incapable of supporting the uncompressed source video.

2. Background Art

There are various types of digital video interface standards in use today that are used to transfer and switch uncompressed video and audio signals from one piece of equipment or another. HDMI®, HDBaseT®, and DisplayPort are examples of such interfaces.

Equipment intended to communicate with these video interfaces is necessarily designed with components available at the time of the video system design. Such equipment transmits the uncompressed video and audio signals bit by bit over long distances using various connectivity technologies such as fiber optics, copper transceivers, and radio waves. Examples of such connectivity technology include HDBaseT, Omron's optical subassemblies, and Owlink. Further, there is also equipment designed for switching video data signals, such as small 2×1 switchers and very large crosspoint matrix switchers. Some switchers are dedicated to a specific video format like HDMI, other switchers are modular and include plug-in cards, and still other switchers are fiber switchers that are agnostic to the video data that passes therethrough. The cost of an installation that includes a large matrix switcher, interface boxes that extend the signal transmission distance, and cabling can be large.

All of the above-described transmission and switching technologies have limitations. Either they have a bandwidth limit or are only compatible with video formats/interfaces that were known at the time the product was designed and sold. Inevitably, new video formats/interfaces are introduced that exceed the capabilities of existing equipment or cabling, thus rendering such equipment or cabling obsolete. Consequently, there exists a need for a system and method for extending the life of existing video equipment and cabling as new high resolution video formats emerge.

SUMMARY OF THE INVENTION

It is to be understood that both the general and detailed descriptions that follow are exemplary and explanatory only and are not restrictive of the invention.

DISCLOSURE OF INVENTION

According to one aspect, the invention involves a video distribution system that includes a plurality of physical transmission layers, and a plurality of video links. A first of the plurality of video links is a first of the plurality of physical transmission layers, and a second of the plurality of video links is a second of the physical transmission layers. The system further includes a video signal transmitter that includes a first input port configured for receiving an uncompressed source video signal that is incompatible with a first of the plurality of video links, a compressor configured for compressing the uncompressed source video signal into a compressed video signal having a bandwidth lower than the bandwidth of the uncompressed source video signal, a reformatter configured for reformatting the compressed video signal to simulate an uncompressed video signal having a bandwidth lower than the bandwidth of the uncompressed video signal and that is compatible with the first of the plurality of video links, and a first output port configured for transmitting the compressed video signal that simulates an uncompressed video signal through the first of the plurality of video links. The system further includes a video signal receiver that includes a second input port configured for receiving the compressed video signal that simulates an uncompressed video signal, a decompressor configured for decompressing the compressed video signal that simulates an uncompressed video signal into a decompressed video signal, and a second output port configured for transmitting the decompressed video signal through a second of the plurality of video links.

One embodiment the system further includes a video source in communication with the transmitter through a third of the plurality of video links. The video source provides the uncompressed source video signal that is incompatible with the first of the plurality of video links. The system further includes one or more displays configured for receiving the decompressed source video through the second of the plurality of video links.

In another embodiment, the system further includes a switcher in communication with the first of the plurality of video links and in communication with the receiver through a fourth of the plurality of video links.

In still another embodiment, the uncompressed source video signal is encrypted and the video signal transmitter further comprises a decryption transceiver configured for decrypting the encrypted uncompressed source video signal before the encrypted uncompressed source video signal is compressed and reformatted. The video signal transmitter further includes an encryption transceiver configured for encrypting the compressed video signal that simulates an uncompressed video signal before the compressed video signal that simulates an uncompressed video is transmitted through the first of the plurality of video links.

In yet another embodiment, the compressed video signal that simulates an uncompressed video signal is encrypted and the video signal receiver further includes a decryption transceiver configured for decrypting the compressed video signal that simulates an uncompressed video signal before the compressed video signal that simulates an uncompressed video signal is decompressed and reformatted. The video signal receiver further includes an encryption transceiver configured for encrypting the decompressed source video signal before the decompressed source video signal is transmitted through the second of the plurality of video links.

In still another embodiment, the first of the plurality of physical transmission layers and the second of the plurality of physical transmission layers each employ a different video standard.

In another embodiment, the system further includes a processor and a bidirectional communication link configured for transmitting to the processor supported bandwidths of each of the one or more displays, and supported bandwidths of at least the transmitter and the receiver. The processor is configured for determining the highest common bandwidth for all of the one or more displays, determining the highest common bandwidth for at least the transmitter and receiver, comparing the highest common bandwidth for all of the one or more displays to the highest common bandwidth for at least the transmitter and receiver, and determining the level of compression needed for compressing the uncompressed source video signal based on the comparison.

In yet another embodiment, the transmitter further includes a decoder configured for decoding the uncompressed source video signal, which is in a first video format, and an encoder for encoding the compressed video signal that simulates an uncompressed video signal into a second video format.

According to another aspect, the invention involves a method of transmitting an uncompressed video signal from a video source through a video distribution system that comprises a plurality of video links, a video source, one or more displays, a transmitter, and a receiver. The method includes receiving, by a transmitter, from a video source, an uncompressed source video signal that is incompatible with a first of the plurality of video links on a first of a plurality of physical transmission layers, compressing the uncompressed source video signal into a compressed video signal having a bandwidth lower than the bandwidth of the uncompressed video signal, reformatting the compressed video signal to simulate an uncompressed video signal having a bandwidth lower than the bandwidth of the uncompressed source video signal and that is compatible with the first of the plurality of video links, transmitting, by the transmitter, the compressed video signal that simulates an uncompressed video signal through the first of the plurality of video links, receiving, by a receiver, from the transmitter, the compressed video signal that simulates an uncompressed video signal, decompressing the compressed video signal that simulates an uncompressed video signal into a decompressed video signal, and transmitting, by the receiver, to the one or more displays, the decompressed source video signal through a second of the plurality video links on a second of the plurality of physical transmission layers.

In one embodiment, the uncompressed source video signal is encrypted, and the method further includes decrypting the encrypted uncompressed source video signal before the encrypted uncompressed source video signal is compressed and reformatted. The method further includes encrypting the compressed video signal that simulates an uncompressed video signal before the compressed video signal that simulates an uncompressed video is transmitted through the first of the plurality of video links.

In another embodiment, the compressed video signal that simulates an uncompressed video signal is encrypted, and the method further includes decrypting the compressed video signal that simulates an uncompressed video signal before the compressed video signal that simulates an uncompressed video signal is decompressed and reformatted. The method further includes encrypting the decompressed source video signal before the decompressed source video signal is transmitted through the second of the plurality of video links.

In still another embodiment, the method further includes receiving, through a bidirectional communication link, supported bandwidths of each of the one or more displays and determining the highest common bandwidth for all of the one or more displays. The method further includes receiving, through the bidirectional communication link, supported bandwidths of at least the transmitter and the receiver, and determining the highest common bandwidth for at least the transmitter and the receiver. The method further includes comparing the highest common bandwidth for all of the one or more displays to the highest common bandwidth for at least the transmitter and receiver, and determining the level of compression needed for compressing the uncompressed source video signal based on the comparison.

In yet another embodiment, the method further includes decoding the uncompressed source video signal, which is in a first video format, and encoding the compressed video signal that simulates an uncompressed video signal into a second video format.

According to still another aspect, the invention involves a method of determining the bandwidth limitation of a video distribution system that comprises a transmitter, a receiver, and one or more displays. The method includes reading the EDID of each of the one or more displays, determining, from each display EDID, the bandwidths supported by each of the one or more displays, determining the highest common bandwidth for all of the one or more displays, reading the EDID of at least each of the transmitter and the receiver, determining, from the EDID of at least each of the transmitter and the receiver, the bandwidths supported by the transmitter and the receiver, determining the highest common bandwidth for at least the transmitter and the receiver, comparing the highest common bandwidth for all of the one or more displays to the highest common bandwidth for at least the transmitter and the receiver, and determining the bandwidth limitation of the video distribution system based on the comparison.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
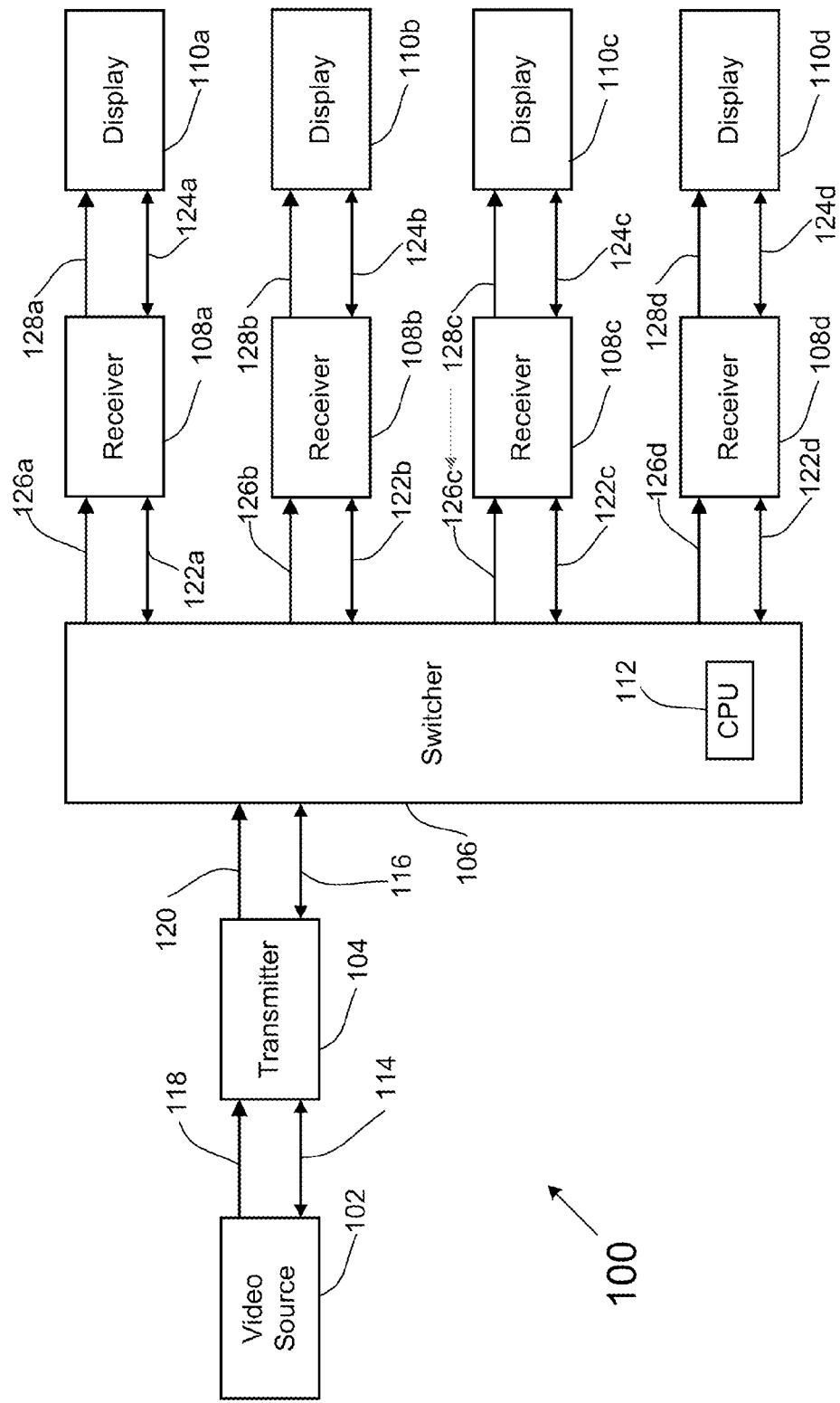
FIG. 1 is an illustrative block diagram of a video distribution system, according to one embodiment of the invention.

The following is a list of the major elements in the drawings in numerical order.
100 video distribution system
102 video source
104 transmitter
106 switcher
108a-d receiver
110a-d display
112 video distribution system CPU
114 DDC channel for transmitter EDID
116 DDC channel for switcher EDID
118 video channel
120 video channel
122a-d DDC channel for receiver EDID
124a-d DDC channel for display EDID
126a-d video channel
128a-d video channel
202 input digital video cable from video source
204 decryption transceiver
206 FPGA
208 encryption transceiver
210 output digital video cable to switcher
212 deserializer
214 decoder
216 compressor
218 butter FIFO
220 reformatter
222 audio combiner
224 output encoder
226 serializer
228 transmitter CPU
230 video timing generator
232 EDID RAM
302 PLL
304 Hsync generator
306 Vsync generator
308 DE generator
402 input digital video cable from switcher
404 decryption transceiver
406 FPGA
408 encryption transceiver
410 output digital video cable to display
412 deserializer
414 decoder
416 decompressor
418 buffer FIFO
420 reformatter
422 audio combiner
424 output encoder
426 serializer
428 receiver CPU
430 video timing generator
432 EDID RAM
502 PLL
504 Hsync generator
506 Vsync generator
508 DE generator
602 input horizontal timing
604 input vertical timing
606 output horizontal timing
608 output vertical timing
702 Receive uncompressed video
704 Decrypt uncompressed video
706 Store source video signal format information
708 Obtain DHCB and modify EDID
710 Store compatible formats and compression instructions
712 Read source video signal format information
714 Compare with bandwidth limitation of video distribution system and determine if compatible/supported
716 Transmit video signal without modification
718 Deserialize video
720 Decode video
722 Compress video
724 Clock video into FIFO and then into the reformatter
726 Reformat video
728 Combine audio and video
730 Encode video
732 Serialize video
734 re-encrypt video
736 Transmit video
802 Receive compressed video
804 Decrypt compressed video
806 Store input video signal format information
808 Read input video signal information
810 Determine if video is compressed
812 Transmit video unmodified to display
814 Deserialize video
816 Decode video
818 Decompress video
820 Clock video into FIFO and then into the reformatter
822 Reformat video
824 Combine audio and video
826 Encode video
828 Serialize video
830 Re-encrypt video
832 Transmit video to display
902 Read EDID of all downstream displays
904 Determine the bandwidths supported by each of the displays
906 Determine the HCB for all the displays
908 Read EDID of all components in the video signal path
910 Determine the bandwidths supported by each of the components
912 Determine the SCB for all the remaining components in the video signal path
914 Compare the SHCB to the DHCB
916 No compression needed
918 Modify EDID of transmitter to equal DHCB
920 Set bit 7 to turn on compression and set bits 6:0 to define the level of compression
922 Modify EDID of transmitter to equal DHCB

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The present disclosure involves a transmitter for use in an existing video distribution system/infrastructure where the transmitter is configured for receiving an uncompressed video signal from a video source, compressing the video signal from the video source, reformatting the compressed video to mimic or simulate uncompressed video with a lower bandwidth than the uncompressed video from the video source, and transmitting the compressed video mimicking uncompressed video with a lower bandwidth to a receiver via a various components in the video distribution system, such as switches, a switching matrix, repeaters, extenders, and associated audio/video transmission cables and connectivity technology (e.g., copper wire, fiber optics, cat5e, etc,), where one or more of the various components are incapable of supporting the uncompressed source video.

The present disclosure also involves a receiver for use in an existing video distribution system/infrastructure where the receiver is configured for receiving the compressed video mimicking uncompressed video with a lower bandwidth, decompressing the video, reformatting the video into its original format (or other appropriate format), and transmitting the decompressed source video to a video sink (e.g., display).

The disclosed transmitter and receiver, when integrated with an existing video distribution system/infrastructure, allow the other components, such as switches, a switching matrix, repeaters, extenders, and associated audio/video transmission cables and connectivity technology (e.g., copper wire, fiber optics, cat5e, etc,), in the video distribution system/infrastructure to continue being used while supporting video bandwidths that are greater than the video bandwidths the existing video distribution system/infrastructure could otherwise support.

Referring to FIG. 1, a video distribution system 100 is shown. In one embodiment, the video distribution system 100 includes a video source 102 (e.g., Blu-ray Disc® player), a transmitter 104, a switcher 106 that includes a system central processing unit (CPU) 112, receivers 108a-108d (generally 108), displays 110a-110d (generally 110), and all associated audio/video transmission cables and connectivity technology, such as video links 118, 120, 126a-d (generally 126), 128a-d (generally 128). The video distribution system 100 also includes bidirectional display data channel (DDC) links 114, 116, 122a-d (generally 122), and 124a-d (generally 124). In other embodiments, the system 100 includes more or less receivers 108 and displays 110 (e.g., LCD television).

It should be noted that each of the video links 118, 120, 126a-d, and 128a-d are physical transmission layers. Typically, the physical transmission layer for video link 120 is different from the physical transmission layers for video links 128a-d. In other words, the physical transmission layer for the video link 120 (communication link between the transmitter 104 and the switcher 106) is a different connectivity standard or interface than the physical transmission layers for video links 128a-d (communications links between receivers 108a-d and displays 110a-d, respectively). For example, the connectivity standard or interface for video link 120 is HDBaseT, while the connectivity standard or interface for video links 128a-d is HDMI. Other combinations are possible.

In yet another embodiment, the video distribution system includes a video source, a transmitter, a receiver, a display and all associated audio/video transmission cables and connectivity technology. In this embodiment, all of the functionality of the switcher 106 (described below) is implemented in the transmitter.

Figure 2:
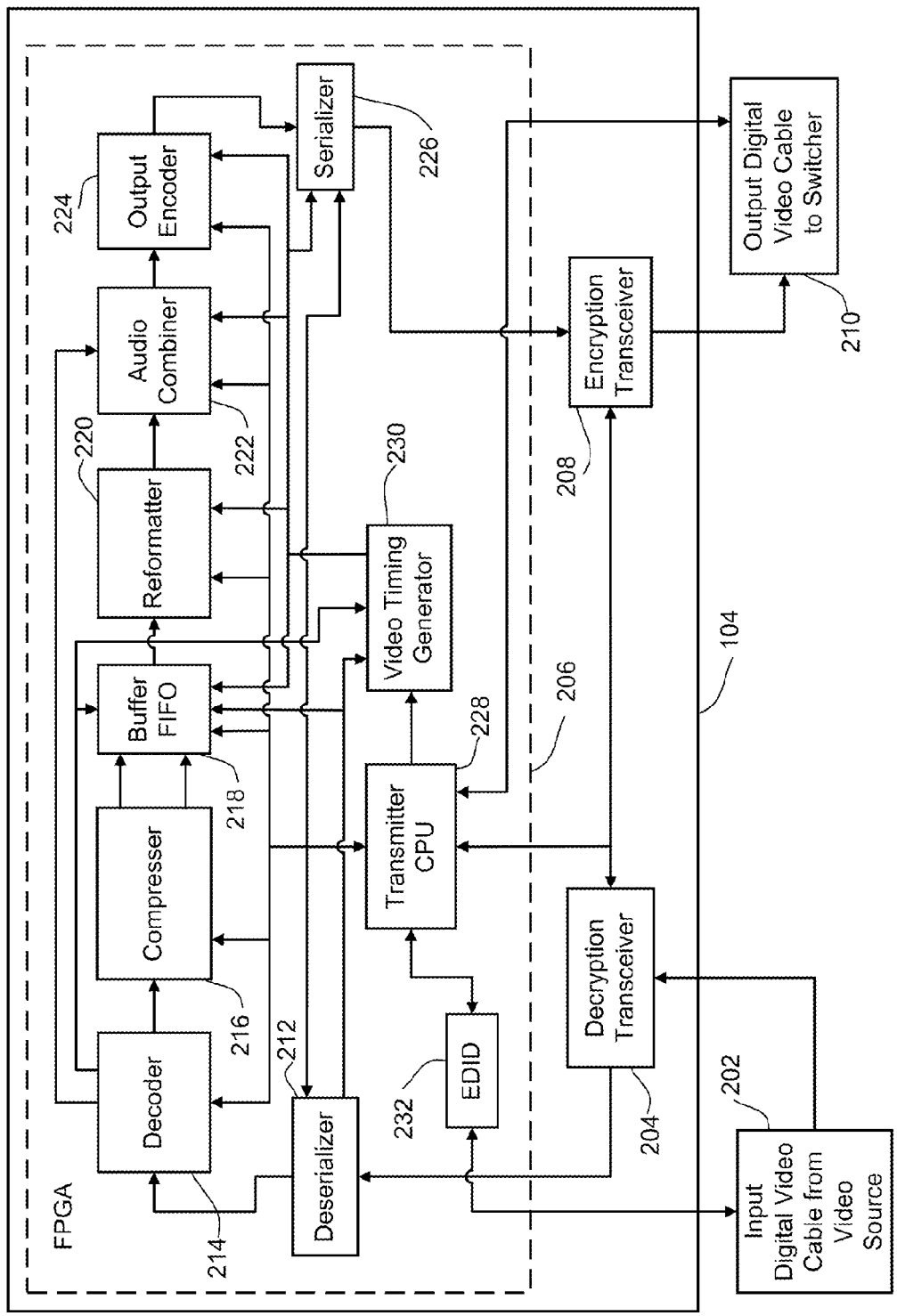
FIG. 2 is an illustrative block diagram of a transmitter from the video distribution system of FIG. 1.

Referring to FIG. 2, one embodiment of the transmitter 104 is shown. The transmitter 104 includes a decryption transceiver 204, a field programmable gate array (FPGA) 206, and an encryption transceiver 208. The FPGA 206 includes a deserializer 212, an input decoder 214, a compressor 216, a buffer FIFO (first in first out) 218, a reformatter 220, an audio combiner 222, an output encoder 224, a serializer 226, and EDID RAM 232, a transmitter CPU 228, and a video timing generator 230.

Many video distribution systems utilize video/data protection such as High Definition Content Protection (HDCP). In the event that the video signal from the video source 102 is encrypted, decryption is performed by the decryption transceiver 204. In one embodiment, the video signal is decrypted, if necessary, before it is deserialized. In other embodiments, the video signal is decrypted, if necessary, at a later stage in the compression/reformatting process. Analog Devices and Silicon Image both make devices designed to receive a High Definition Multimedia Interface (HDMI) encrypted stream and output a non-encrypted HDMI stream for use within a particular design only.

The decryption transceiver 204 also includes status registers in which source video format information is stored, such as interface standard, bandwidth, and resolution, for example. This information is read by the transmitter CPU 228 (discussed below) and used to determine if the input source video format is compatible with the video distribution system/infrastructure.

The deserializer 212 receives high speed serial data (e.g., video signal) and outputs parallel data and the source video pixel clock. The deserializer 212 also transmits the original uncompressed input source video signal pixel clock to the video timing generator 230 and the buffer FIFO 218. The deserializer 212 is implemented on the FPGA 206 using the Serializer/Deserializer (SerDes) capabilities of the FPGA input/output (I/O).

The input decoder 214 decodes the deserialized source video signal into the video signal's fundamental elements, which include video data, audio data, sync information (Vsync, Hsync, and data enable (DE)), and control data. The control data describes the format of the video and audio data including resolution, color space, color depth, sampling rates, etc., and is transmitted with the audio data to the auto combiner 222 discussed below. The decoder 214 transmits Hsync, Vsync, and data enable (DE) to the video timing generator 230 and the buffer FIFO 218. The decoder 214 is implemented on the FPGA 206. An example of an FPGA implemented decoder is the Bitec HDMI 2.0 IP Core.

The compressor 216 compresses the source video data to reduce the bandwidth required to transmit it. The level of compression applied to the uncompressed source video data is stored in memory registers on the transmitter CPU 228 and is based on a comparison of the bandwidth capability/limitation of the video distribution system and the bandwidth of each of the downstream displays, and is discussed in detail below.

As the compressor 216 compresses the source video data, the overall output bandwidth from the compressor 216 is lower than the bandwidth of the original input video stream. Therefore, the compressor 216 generates an associated data valid signal that is synchronized to the original uncompressed input source video signal pixel clock. The compressor 216 is implemented on the FPGA 206 using light compression technology, such as TICO by Intopix.

In various embodiments, the video data compression is lossless or lossy. The compression type (lossless or lossy) is chosen based on a tradeoff between the image quality desired and the compression ratio necessary to fit the video data into a new video format. For example, near mathematically lossless compression typically achieves a 2:1 compression ratio. This type of compression would allow an uncompressed 300 MHz video signal to be compressed into a new 150 MHz signal. With lossy compression, a 4:1 compression can be achieved with minimal latency thereby allowing a 600 MHz video signal to be compressed into a 150 MHz signal.

In other embodiments, the compressed video signal also includes information about the format of the original uncompressed video signal, which is used by a downstream device to recreate the original uncompressed video signal.

The buffer FIFO 218 is used to store the compressed video data and buffer the data to the video reformatter 220, which is described below. The buffer FIFO 218 is a dual clocked FIFO and is implemented in the FPGA 206 with FIFOs inside the FPGA 206. The FIFO 218 receives compressed video data and a data valid signal from the compressor 216, timing signals from the video timing generator 230 (pixel clock, Hsync, Vsync, and data enable (DE)), which is discussed below, the source video pixel clock from the deserializer 212, and source video Hsync, Vsync, and DE from the decoder 214. The input of the FIFO 218 is clocked by the source video pixel clock and the compressed video data is shifted into the FIFO 218 from the compressor 216 when the data valid signal from the compressor 216 is asserted.

The output of the FIFO 218 is clocked by the new, slower, pixel clock from the video timing generator 230 and the compressed video data is shifted out of the FIFO 218 when DE is asserted. It should be noted that the timing for the output of the FIFO 218 needs to be delayed to compensate for signal processing delays incurred in the compressor 216 and FIFO 218 using methods known to those skilled in the art.

The video reformatter 220 is implemented in the FPGA 206, and receives the compressed video data from the FIFO 218 and timing signals from the video timing generator 230, which is discussed below. The video reformatter 220 reformats the compressed video data from the FIFO 218 into a format that mimics uncompressed video data at a lower bandwidth so that the compressed video data is compatible with the various components in the video distribution system/infrastructure.

More specifically, as the compressed video data is clocked from the FIFO 218 into the reformatter 220 using new pixel clock, DE, Hsync, and Vsync (i.e., lower bandwidth timing), the reformatter 220 uses the new pixel clock, DE, Hsync, and Vsync to format the compressed video data into a parallel video data stream that mimics the active video region of the new video signal.

In other words, the compressed video data is compressed by a ratio that enables the reformatter 220 to divide the compressed video data into lines with active regions and horizontal blanking regions/intervals, and then group the lines into frames with vertical blanking regions/intervals. The compressed video data packets are transmitted only during the active region (region normally used for uncompressed pixels) of an uncompressed video signal at the lower bandwidth. No compressed video data packets are transmitted during the blanking regions/intervals.

The audio combiner 222 combines the original audio data with the new (compressed and reformatted) video data stream by inserting the audio data into data islands in the newly created blanking intervals/regions described above. The audio combiner 222 is implemented in the FPGA 206 using methods known to those skilled in the art.

Typically, the audio data does not have to be modified. In some embodiments, the audio data is sample data, such as pulse code modulation (PCM) or direct stream digital (DSD). In other embodiments the audio data is encoded data such as that used in various Dolby and DTS formats.

In other embodiments, associated audio control information must be updated to be compatible with the new video format. For example, HDMI control information defines the audio clock rate in terms of the pixel clock rate using the CTS and N parameters. Since the new video format has a different pixel clock, the audio combiner 222 calculates new audio clock parameters and inserts them into the new signal.

The output encoder 224 encodes the reformatted video data, audio data, and control data (from the decoder 214 and CPU 228) for the desired output video standard, such as HDMI, DisplayPort, etc. The encoder 224 is implemented on the FPGA 206. An example of an FPGA implemented decoder is the Bitec HDMI 2.0 IP Core.

Note that it is possible to change the video standard from the standard of the source. Since the disclosed transmitter 104 fully decodes the video and audio samples, the video and audio samples can be re-encoded into alternate formats. For example, the source video could be DisplayPort and the output video could be HDMI. Other combinations are possible. Both Altera and Xilinx have various encoders available to format the video data into different video standards.

The serializer 226 receives the encoded video signal from the output encoder 224 and outputs high speed serial data (e.g., video signal). Serializer 226 is implemented on the FPGA 206 using the Serializer/Deserializer (SerDes) capabilities of the FPGA input/output (I/O).

If the original input video signal was encrypted, then after the audio is combined with the compressed video it can be re-encrypted prior to exiting the transmitter 104 on a cable by the encryption transceiver 208. In some embodiments, the encryption is performed after the video signal is encoded by the output encoder 224. In other embodiments, the encryption is performed before the video signal is encoded into the final formatted video signal. There are external transceivers available from Analog Devices and Silicon Image that take an unencrypted TMDS/HDMI input and create an encrypted TMDS/HDMI output. For example, the Analog Devices ADV7625 is capable of decrypting or encrypting HDMI signals.

The EDID RAM (extended display identification data random access memory) 232 is used to store the EDID of the transmitter 104 (i.e., the supported bandwidth), and transmit the EDID to the video source 102 via the DDC link 114. The EDID of the transmitter 104 is the highest common bandwidth of all the downstream displays. In one embodiment the EDID RAM is implemented on the FPGA 206.

Figure 3:
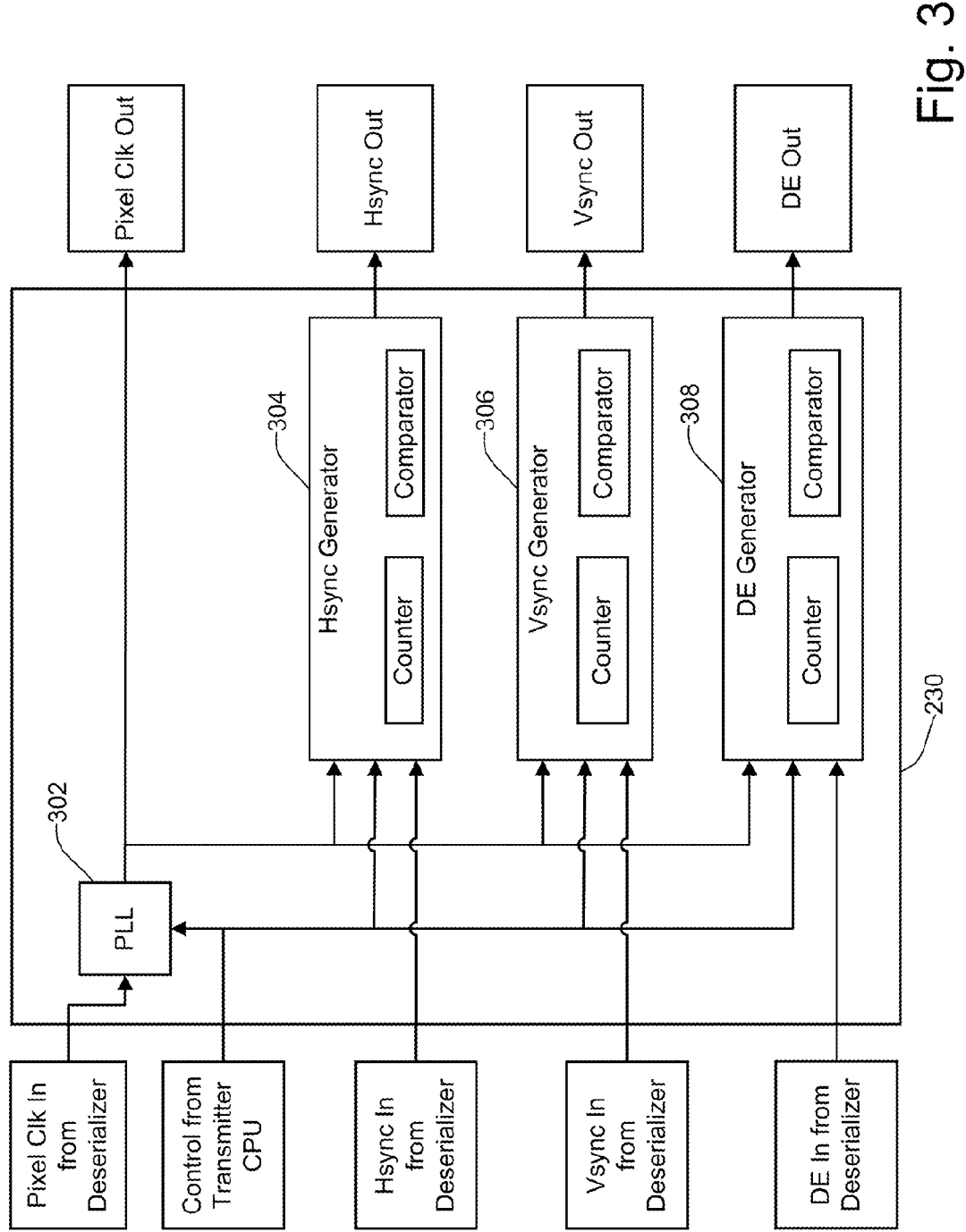
FIG. 3 is an illustrative block diagram of a video timing generator from the transmitter of FIG. 2.

Referring to FIGS. 2 and 3, one embodiment of the video timing generator 230 is shown. The video timing generator 230 is implemented on the FPGA 206 and includes a phased locked loop (PLL) 302, a Hsync generator 304, a Vsync generator 306, and data enable (DE) generator 308. In one embodiment the Hsync generator 304, the Vsync generator 306, and the data enable (DE) generator 308 each include counters and comparators. In another embodiment, the new pixel clock is obtained from an integer divider that divides the source pixel clock down to a lower frequency with ratios such as source frequency/2 or source frequency/4.

The video timing generator 230, using the original uncompressed source video pixel clock from the deserializer 212, and source horizontal sync (Hsync), source vertical sync (Vsync), and source data enable (DE) from the decoder 214, creates a new slower pixel clock, new horizontal sync (Hsync), new vertical sync (Vsync), and a new data enable (DE) via the PLL 302, the Hsync generator 304, the Vsync generator 306, and data enable (DE) generator 308. The video timing generator 230 transmits these new timing signals to the FIFO 218, the reformatter 220, the audio combiner 222, the output encoder 224, and the serializer 226.

Figure 6A:
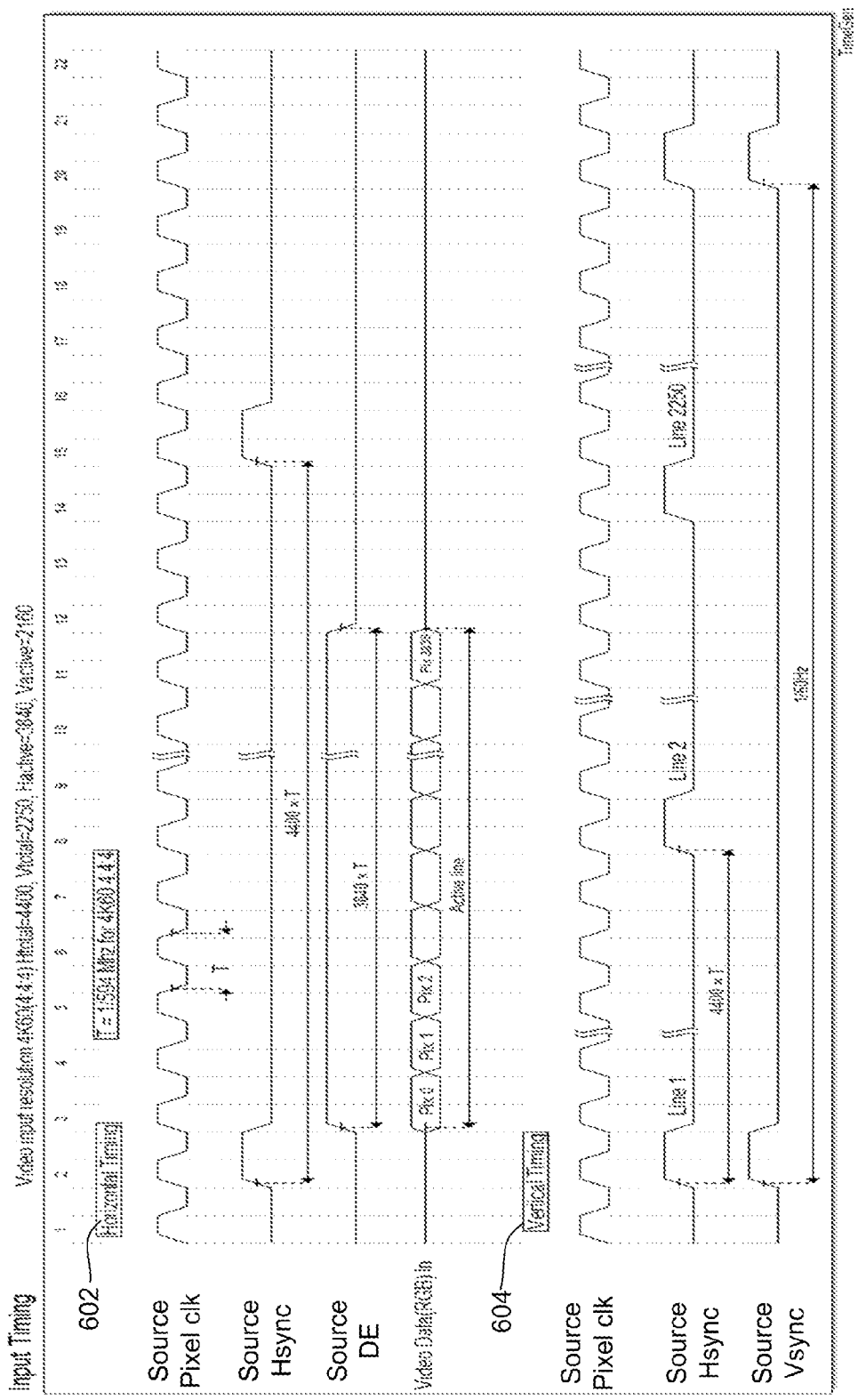
FIGS. 6A and 6B show illustrative timing diagrams for video signal reformatting, according to one embodiment of the invention.
Figure 6B:
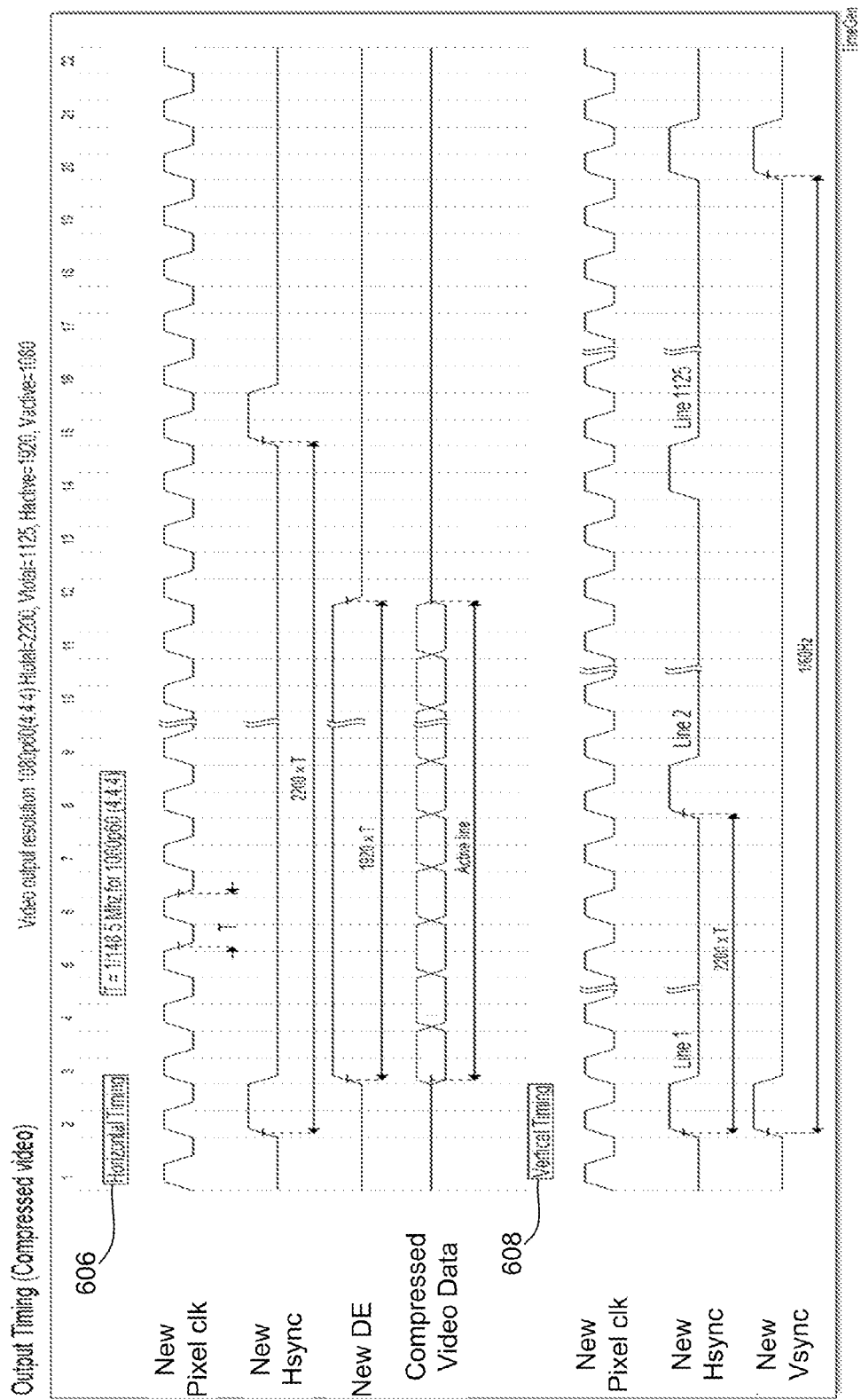

Referring to FIG. 6A, an example of horizontal input timing 602 and vertical input timing 604 for an uncompressed source input video signal with 4K 60 HZ bandwidth is shown. FIG. 6B in an example of horizontal output timing 606 and vertical output timing 608 generated by the video timing generator 230 for compressed video with 1080p 60 HZ bandwidth.

FIGS. 6A and 6B depict an example demonstrating how 4K60 (4:4:4) video signal timing is converted to 1080p60 video signal timing. In this case the video data is compressed (by the compressor 216 with a ratio of (4:1) resulting in a new pixel clock period 4 times that of the input source video data pixel clock. The compressed video data is compressed so that the data rate is ¼ that of the original input source data rate since the number pixels per line and number of lines per frame has been reduced by a factor of 2.

In other embodiments, the new pixel clock does not have to be a lower frequency than the input source pixel clock. The new pixel clock only has to enable generating a video format compatible with the downstream devices. For example, a pixel clock that was synchronously derived from the source video pixel clock would facilitate regenerating the original source video pixel clock during the decoding process. This new pixel clock would be used to create a new video format that had typical video timing signals such as Hsync, Vsync, HBlank, Vblank, and DE.

Referring again to FIG. 2, the transmitter CPU 228 is in communication with, and controls, each of the above-described components. The transmitter CPU 228 is implemented on the FPGA 206 using methods known to those skilled in the art.

The transmitter CPU 228 includes memory registers for storing which video formats are compatible with the downstream components of the video distribution system and compression instructions for video formats that are not compatible.

In one embodiment, the formats that are compatible or preferred and the level of compression required are manually configured using methods that involve a communication port (USB, LAN, RS232), an LCD display, or an on-screen display with buttons, remote controls, or switches on the transmitter 104 or the switcher 106.

In another embodiment, the formats that are compatible with the video distribution system and the level of compression required, if any, are dynamically determined according to an algorithm executed by the CPU 112 of the switcher 106, which is discussed in detail below. The formats that are compatible with the video distribution system are included in the EDID from the switcher 106. The dynamically determined level of compression is indicated is specific bits in the EDID set by the CPU 112 and sent from the switcher 106, and stored in, the transmitter CPU 228.

In still another embodiment, the formats that are compatible with the video distribution system and the level of compression required, if any, are dynamically determined according to an algorithm executed by the CPU 228 of the transmitter 104.

Whether or not compression is necessary is based on a comparison of the bandwidth capability/limitation of the video distribution system components, such as a matrix switcher, video scaler, HDMI input card, a multimode fiber output card, an HDBaseT output card, an HDBaseT receiver, extender, repeater, and associated audio/video transmission cables and connectivity technology (e.g., copper wire, fiber optics, cat5e, etc,), and the bandwidth of each of the downstream displays.

The transmitter CPU 228 also reads the source video signal format information (e.g., format, bandwidth, resolution) from the memory registers in the decryption transceiver 204 and compares this information to the bandwidth limitation of the video distribution system that was manually configured, obtained from the EDID over the bidirectional DDC link from the switcher 106 (or the transmitter 104), or derived from information transmitted over an auxiliary bidirectional communication path to determine if the source video format is supported.

Figure 4:
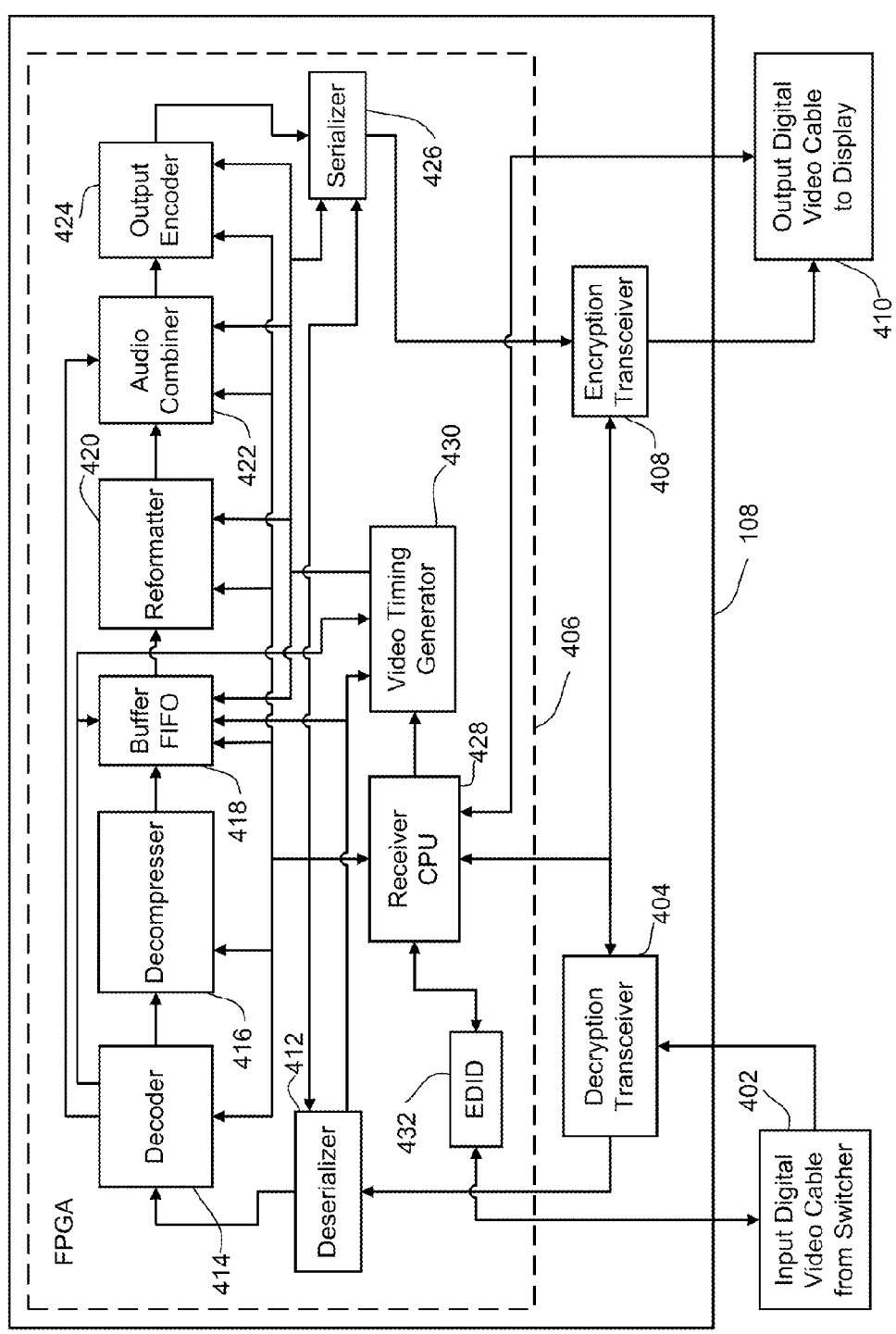
FIG. 4 is an illustrative block diagram of a receiver from the video distribution system of FIG. 1.

Referring to FIG. 4, one embodiment of the receiver 108 is shown. The receiver 108 includes a decryption transceiver 404, a field programmable gate array (FPGA) 406, and an encryption transceiver 408. The FPGA 406 includes a deserializer 412, an input decoder 414, a decompressor 416, a buffer FIFO 418, a reformatter 420, an audio combiner 422, an output encoder 424, a serializer 426, and EDID RAM 432, a receiver CPU 428, and a video timing generator 430.

In the event that the video signal from the switcher 106 is encrypted, decryption is performed by the decryption transceiver 404.

The deserializer 412 receives high speed serial data (e.g., video signal from the switcher 106) and outputs parallel data and the input video pixel clock. The deserializer 412 also transmits the input video signal pixel clock to the video timing generator 430 and the buffer FIFO 418. Deserializer 412 is implemented on the FPGA 206 using the Serializer/Deserializer (SerDes) capabilities of the FPGA input/output (I/O).

The input decoder 414 decodes the deserialized input video signal into the video signal's fundamental elements, which include video data, audio data, sync information, and control data. The control data describes the format of the video and audio data including resolution, color space, color depth, sampling rates, etc., and is transmitted with the audio data to the auto combiner 422 discussed below. The decoder 414 transmits Hsync, Vsync, and data enable (DE) to the video timing generator 430 and the buffer FIFO 418. The decoder 414 is implemented on the FPGA 406.

The decompressor 416 decompresses the compressed input video data (created by and transmitted from the transmitter 104 to the switcher 106). As the decompressor 416 decompresses the compressed input video data, the overall output bandwidth from the decompressor 416 is greater than the bandwidth of the compressed input video data stream. Therefore, the decompressor 416 generates an associated data valid signal that is synchronized to the original source video signal pixel clock. The decompressor 416 is implemented on the FPGA 406 using light compression technology, such as TICO by Intopix.

The buffer FIFO 418 is used to store the decompressed video data and buffer the data to the video reformatter 420, which is described below. The buffer FIFO 418 is a dual clocked FIFO and is implemented in the FPGA 406 with FIFOs inside the FPGA 406. The FIFO 418 receives decompressed video data and a data valid signal from the decompressor 416, timing signals from the video timing generator 430 (pixel clock, Hsync, Vsync, and data enable (DE)), which is discussed below, and the source video pixel clock from the deserializer 412, and input video Hsync, Vsync, and DE from the decoder 414. The input of the FIFO 418 is clocked by the source video pixel clock and the decompressed video data is shifted into the FIFO 418 from the decompressor 416 when the data valid signal from the decompressor 416 is asserted.

The output of the FIFO 418 is clocked by the new (faster) pixel clock from the video timing generator 430 and the decompressed video data is shifted out of the FIFO 418 when DE is asserted. It should be noted that the timing for the output of the FIFO 418 needs to be delayed to compensate for signal processing delays incurred in the decompressor 416 and FIFO 418 using methods known to those skilled in the art.

The video reformatter 420 is implemented in the FPGA 406, and receives the decompressed video data from the FIFO 418 and timing signals from the video timing generator 430, which is discussed below. As the decompressed video data is clocked from the FIFO 418 into the reformatter 420 using the new (faster) pixel clock, DE, Hsync, and Vsync, the reformatter 420 uses the new (faster) pixel clock, DE, Hsync, and Vsync to format the decompressed video data into a parallel video data stream.

The audio combiner 422 combines the original audio data with the original (decompressed and reformatted) video data stream by inserting the audio data into data islands in the blanking intervals/regions. The audio combiner 422 is implemented in the FPGA 206 using methods known to those skilled in the art.

The output encoder 424 encodes the reformatted video data, audio data, and control data (from the decoder 414 and CPU 428) for the desired output video standard, such as HDMI, DisplayPort, etc. The encoder 424 is implemented on the FPGA 406. An example of an FPGA implemented encoder is the Bitec HDMI 2.0 IP Core.

As mentioned above, it is possible to change the video standard from the standard of the source. Since the disclosed receiver 108 fully decodes the video and audio samples, the video and audio samples can be re-encoded into alternate formats. For example, the source video could be DisplayPort and the output video could be HDMI, or a 600 MHz 4 Kp60 4:4:4 HDMI signal could be re-encoded into a new HDMI signal of 300 MHz 4 Kp60 4:2:0 or, with a video scaler, into a 1080p60 signal. Both Altera and Xilinx have various encoders available to format the video data into different video standards.

The serializer 426 receives the encoded video signal from the output encoder 424 and outputs high speed serial data (e.g., video signal). Serializer 426 is implemented on the FPGA 406 using the Serializer/Deserializer (SerDes) capabilities of the FPGA input/output (I/O).

If the original input video signal was encrypted, then after the audio is combined with the uncompressed video it can be re-encrypted prior to exiting the receiver 108 on an output cable 210 by the encryption transceiver 408. In some embodiments, the encryption is performed after the video signal is encoded by the output encoder 424. In other embodiments, the encryption is performed before the video signal is encoded into the final formatted video signal.

The EDID RAM (extended display identification data random access memory) 432 is used to store the EDID of the receiver 108 and the EDIDs of the downstream sinks/displays. These EDIDs are transmitted to the switcher 106 and used for determining the bandwidth capability/limitation of the video distribution system and the bandwidth of each of the downstream displays. In one embodiment the EDID RAM is implemented on the FPGA 406

Figure 5:
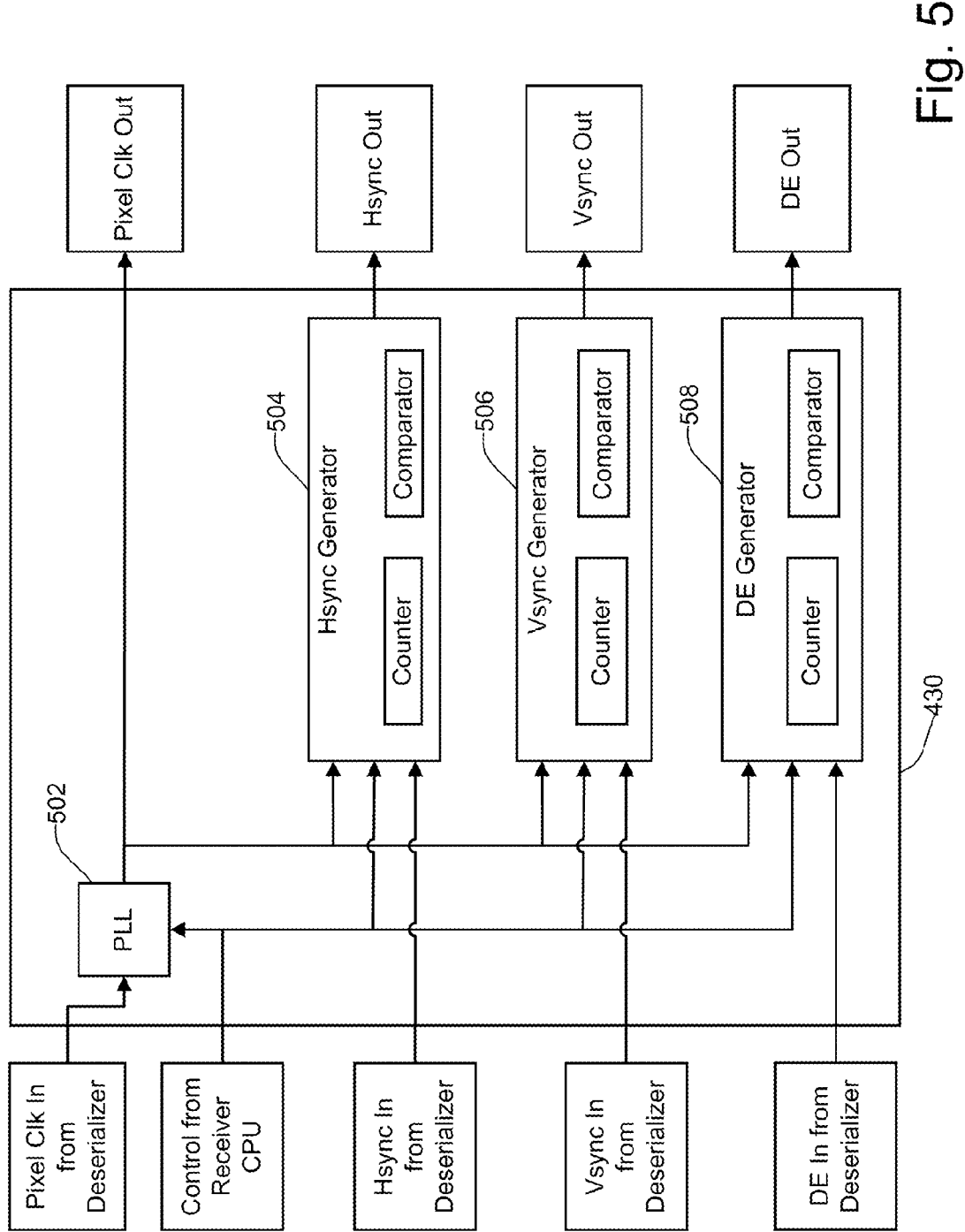
FIG. 5 is an illustrative block diagram of a video timing generator from the receiver of FIG. 4.

Referring to FIGS. 4 and 5, one embodiment of the video timing generator 430 is shown. The video timing generator 430 is implemented on the FPGA 406 and includes a phased locked loop (PLL) 502, a Hsync generator 504, a Vsync generator 506, and data enable (DE) generator 508. In one embodiment the Hsync generator 504, the Vsync generator 506, and the data enable (DE) generator 508 each include counters and comparators. In another embodiment, the new pixel clock is obtained from an integer divider that divides the source pixel clock down to a lower frequency with ratios such as source frequency/2 or source frequency/4.

The video timing generator 430, using the input video pixel clock from the deserializer 412, and the input horizontal sync (Hsync), the input vertical sync (Vsync), and the input data enable (DE) from the decoder 414, creates a new (faster) pixel clock (i.e., the original source pixel clock), horizontal sync (Hsync), vertical sync (Vsync), and data enable (DE) via the PLL 502, the Hsync generator 504, the Vsync generator 506, and data enable (DE) generator 508. The video timing generator 430 transmits these new timing signals to the FIFO 418, the reformatter 420, the audio combiner 422, the output encoder 424, and the serializer 426.

The video timing generator 430 has to recreate the source pixel clock such that it is synchronized with the original source pixel clock. If the output compressed video pixel clock (from the transmitter 104) is generated synchronously by using an integer divider on the original source pixel clock, then reconstructing the source pixel clock at the receiver 108 is reversible by using the PLL 502 to multiply the compressed pixel clock back to the full frequency. As long as the original source pixel clock is recovered, data rate mismatches will be avoided between the transmitter 104 and receiver 108, and the FIFO 418 will not over or underflow.

As mentioned above, FIGS. 6A and 6B depict an example demonstrating how 4K60 (4:4:4) video signal timing is converted to 1080p60 video signal timing Looking at FIGS. 6A and 6B in reverse, the 1080p60 video signal timing (shown in FIG. 6B) is converted back to 4K60 (4:4:4) video signal timing (shown in FIG. 6A). In this reverse example, the compressed video data is decompressed (by the decompressor 416 with a ration of (1:4) resulting in a new pixel clock period ¼ that of the input video data pixel clock. The decompressed data has a data rate 4 times that of the input compressed data.

The receiver CPU 428 is in communication with, and controls, each of the above described components. The transmitter CPU 428 is implemented on the FPGA 406 using methods known to those skilled in the art.

Figure 7:
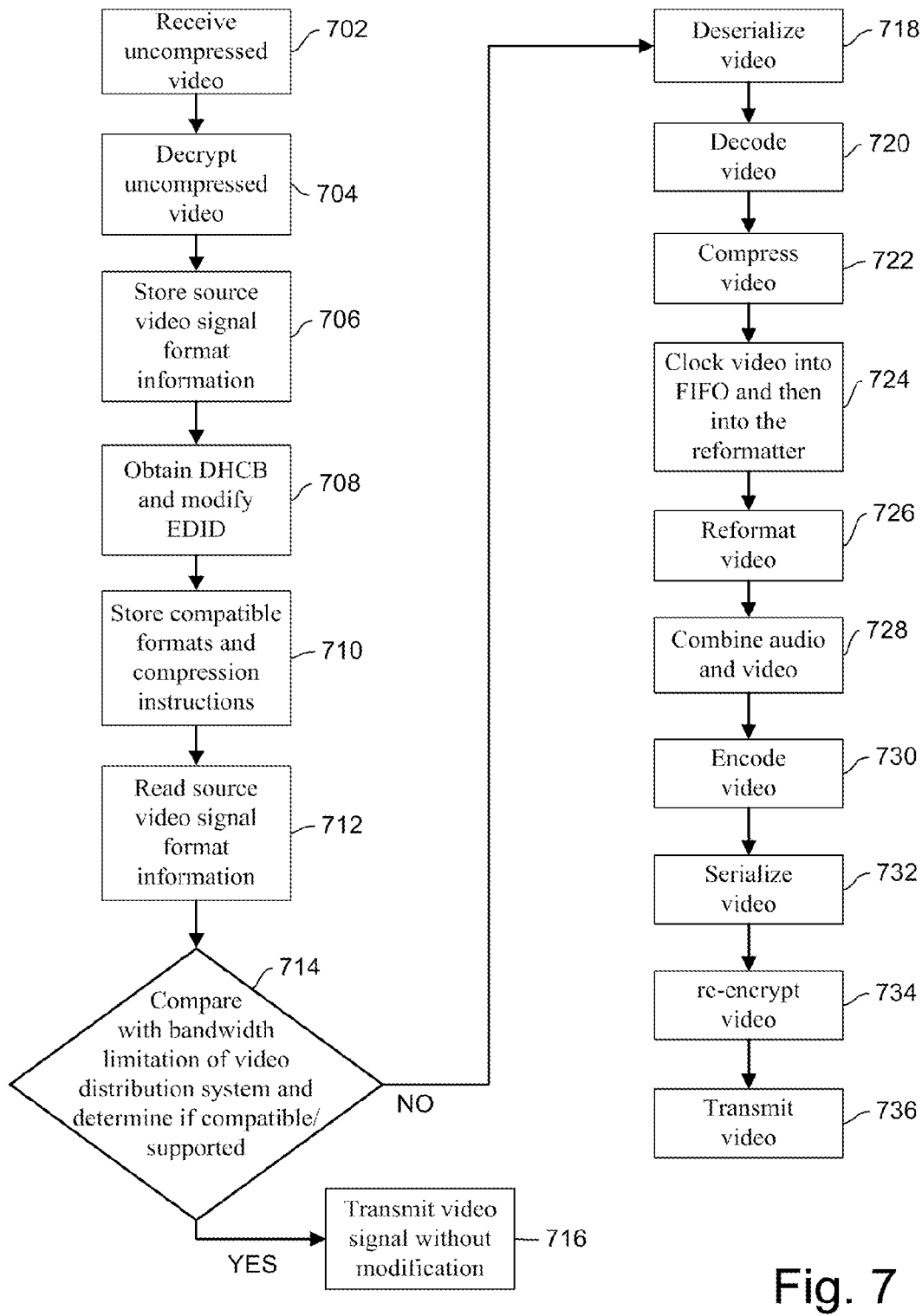
FIG. 7 is an illustrative flow diagram of the method steps for compressing, reformatting, and transmitting compressed video, according to one embodiment of the invention.

Referring to FIGS. 1, 2, and 7, in one embodiment, in operation, the transmitter 104 receives an uncompressed video signal from the source 102 via a connected input digital video cable 202 (Step 702). The source video signal is received by the decryption transceiver 204, which decrypts the source video signal if it is encrypted (Step 704). Additionally, information about the source video signal format (e.g., format, bandwidth, resolution) is stored in status registers that are in the decryption transceiver 204 (Step 706).

The transmitter CPU 228 obtains from switcher 106 the highest common bandwidth of all the downstream displays (DHCB) (via the bidirectional DDC link 116) and modifies the EDID of the transmitter 104 to indicate that the maximum bandwidth supported by the transmitter 104 is the same as the DHCB (Step 708). In another embodiment, the CPU 228 obtains the highest common bandwidth of all the downstream displays from other information transmitted over an auxiliary bidirectional communication path.

The transmitter CPU 228 stores in on-board memory registers which video formats are compatible with the downstream components of the video distribution system and compression instructions for video formats that are not compatible (Step 710). The formats that are compatible and the level of compression required is either manually configured, dynamically determined from the EDIDs of the video distribution system components using an algorithm described below, or dynamically determined from information transmitted over an auxiliary bidirectional communication path.

The transmitter CPU 228 also reads the source video signal format information (e.g., format, bandwidth, resolution) from the memory registers in the decryption transceiver 204 (Step 712) and compares this information to the bandwidth limitation of the video distribution system that was manually configured, obtained from the EDID from the switcher 106 via DDC 116 (or transmitter 104), or determined from information transmitted over an auxiliary bidirectional communication path to determine if the source video format is compatible (Step 714).

The determination of whether or not the source video signal format is compatible with the attached video distribution system/infrastructure is based on whether or not the bandwidth of the video distribution system can support (transmit) the bandwidth of the source video signal requested by the downstream displays. If the source video format is supported by, or compatible with, the video distribution system, then the source video will be transmitted by the transmitter 104 without modification (Step 716). If, however, the source video is not compatible with the video distribution system, then the decoding/compression/reformatting/encoding process is executed as described below.

After the source video signal has been decrypted, the source video signal is passed to the deserializer 212 where the input source video signal (a high speed serial data signal) is converted to a parallel video data signal (Step 718). The deserialized source video signal is then decoded by the input decoder 214 into the video signal's fundamental elements, which include video data, audio data, format information, Vsync, Hsync, data enable, and control data (Step 720).

After the source video has been decoded, the source video data is passed to the compressor 216, which compresses the source video data to reduce the data rate required to transmit, and generates an associated data valid signal that is synchronized to the original uncompressed input source video signal pixel clock (Step 722).

Next, the input of the FIFO 218 is clocked by the source video pixel clock and the compressed video data is shifted into the FIFO 218 from the compressor 216 when the data valid signal from the compressor 216 is asserted, and the output of the FIFO 218 is clocked by the new, slower, pixel clock from the video timing generator 230 and the compressed video data is shifted out of the FIFO 218 (when DE is asserted) and into the video reformatter 220 (Step 724).

The video reformatter 220 reformats the compressed video data from the FIFO 218 into a format that mimics uncompressed video data at a lower bandwidth so that the compressed video data is compatible with the various components in the video distribution system/infrastructure (Step 726).

After the compressed video data has been reformatted, the audio combiner 222 combines the original audio data with the new (compressed and reformatted) video data stream by inserting the audio data (obtained from the decoder 214) into data islands in the blanking intervals/regions (Step 728).

Next, the output encoder 224 encodes the reformatted video data, audio data, and control data for the desired output video standard, such as HDMI, or DisplayPort, for example (Step 730). The serializer 226 receives the encoded video signal from the output encoder 224 and outputs high speed serial data (e.g., video signal) (Step 732). If the original input video signal was encrypted, then the compressed video is re-encrypted by the encryption transceiver 208 (Step 734). Finally, the compressed video, which is now reformatted to mimic an uncompressed video at a lower bandwidth, is transmitted to the switcher 106 via an output cable 210 (Step 736).

Figure 8:
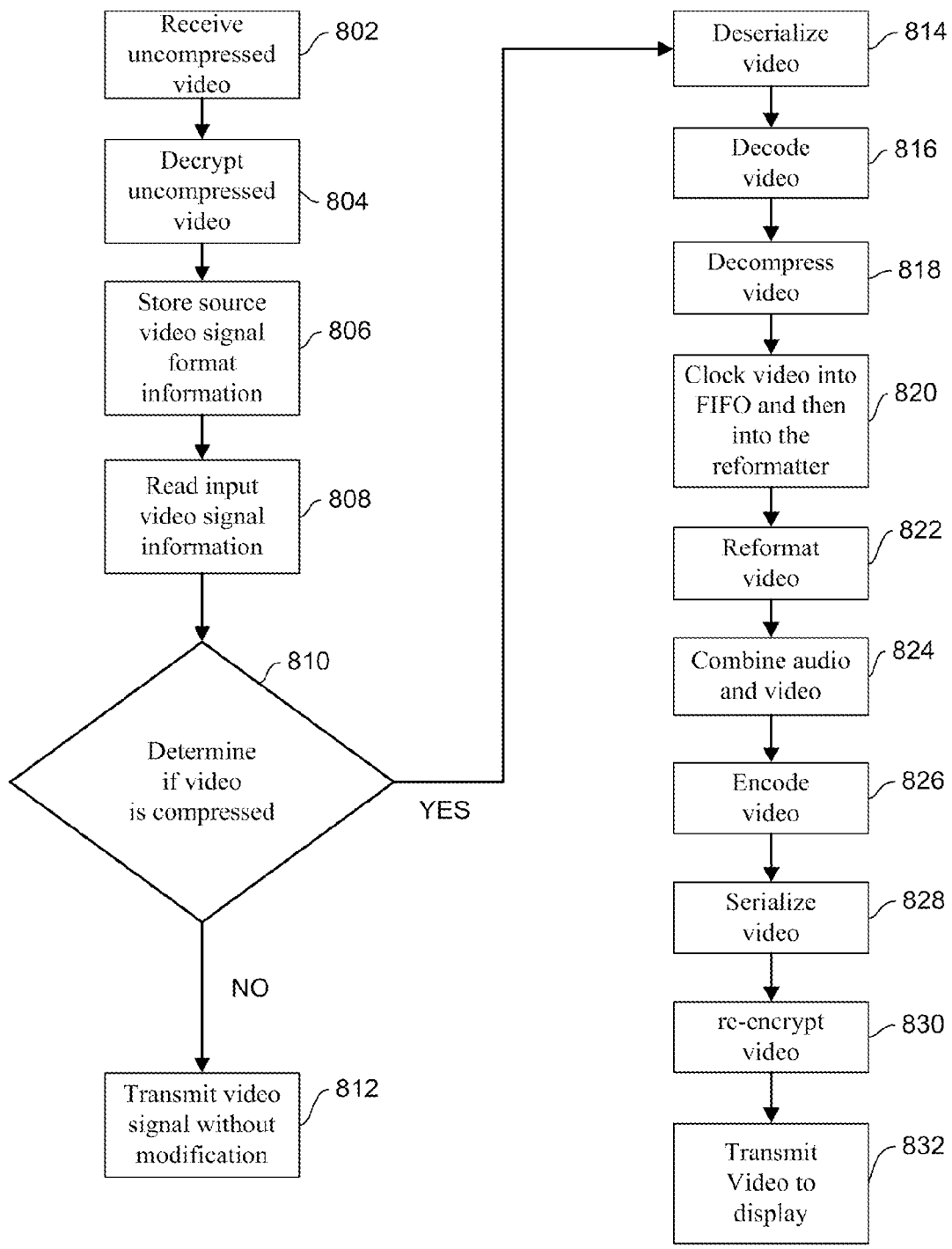
FIG. 8 is an illustrative flow diagram of the method steps for uncompressing, reformatting, and transmitting uncompressed video, according to one embodiment of the invention.

Referring to FIGS. 1, 2, and 8, in one embodiment, in operation, the receiver 108 receives an input (compressed) video signal (mimicking an uncompressed video signal) from the switcher 106 via a connected input digital video cable 402 (Step 802). The compressed video signal is received by the decryption transceiver 404, which decrypts the input video signal if it is encrypted (Step 804). Additionally, information about the input video signal format is stored in status registers that are in the decryption transceiver 404 (Step 806).

The receiver CPU 428 reads the input video signal format information stored in the status registers of the decryption transceiver 404 (Step 808) and then determines if the input video signal is compressed (Step 810). If the input video signal is not compressed, the input video signal is passed through unmodified to an attached display (Step 812). If the input video signal is compressed, the source video signal is passed to the deserializer 412 where the input source video signal (a high speed serial data signal) is converted to a parallel video data signal (Step 814). The deserialized input video signal is then decoded by the input decoder 414 into the video signal's fundamental elements, which include video data, audio data, format information, Vsync, Hsync, data enable, and control data (Step 816).

After the input video has been decoded, the input video data is passed to the decompressor 416, which decompresses the input video data, and generates an associated data valid signal that is synchronized to the original uncompressed input source video signal pixel clock (Step 818).

Next, the input of the FIFO 418 is clocked by the source video pixel clock and the decompressed video data is shifted into the FIFO 418 from the decompressor 416 when the data valid signal from the decompressor 416 is asserted, and the output of the FIFO 418 is clocked by the new, faster, pixel clock from the video timing generator 430 and the decompressed video data is shifted out of the FIFO 418 (when DE is asserted) and into the video reformatter 420 (Step 820).

The video reformatter 420 reformats the decompressed video data from the FIFO 418 into a parallel data stream (Step 822). After the decompressed video data has been reformatted, the audio combiner 422 combines the original audio data with the decompressed video data stream by inserting the audio data (obtained from the decoder 414) into data islands in the blanking intervals/regions (Step 824). Next, the output encoder 424 encodes the reformatted video data, audio data, and control data for the desired output video standard, such as HDMI, or DisplayPort, for example (Step 826).

The serializer 426 receives the encoded video signal from the output encoder 424 and outputs high speed serial data (e.g., video signal) (Step 828). If the original input video signal was encrypted, then the decompressed video is re-encrypted by the encryption transceiver 408 (Step 830). Finally, the decompressed video is transmitted to the display 110 via an output cable 410 (Step 832).

Figure 9:
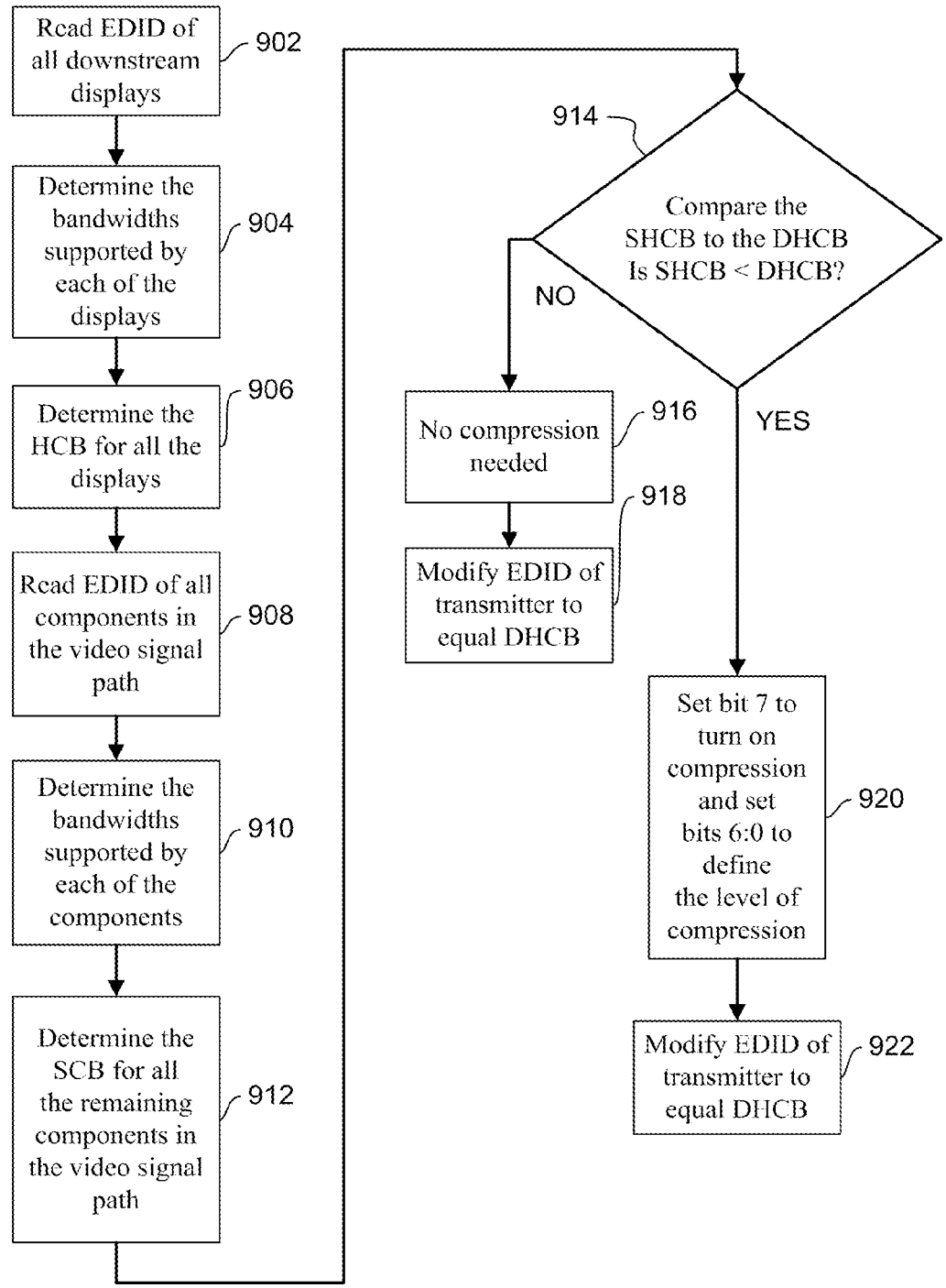
FIG. 9 is an illustrative flow diagram of the method steps for dynamically determining bandwidth capability of a video distribution system, according to one embodiment of the invention.

Referring to FIGS. 1, 2, and 9, in one embodiment, as mentioned above, the video formats (bandwidths) that are compatible with the video distribution system, and the level of compression required to transmit a source video signal to one or more displays are dynamically determined according to an algorithm executed by the CPU 112 of the switcher 106, and then transmitted to, and stored in, memory registers in the transmitter CPU 228.

In should be noted that video devices (e.g., matrix switchers, transmitters, receivers, displays, etc.) and links are hardware limited to a maximum bandwidth. Bandwidth is the bit rate of the video stream after it is encoded and serialized. The bandwidth of a video format can be calculated by determining how many bits need to be transferred per second to refresh the display. The following formula can be used to approximate the bandwidth of a video format.

$$\text{Bandwidth} = \text{Total Horizontal Pixels} * \text{Total Vertical Pixels} * \text{Refresh Rate} * \text{Total color depth per pixel} * \text{Encoding overhead}$$

The EDID of a display provides the list of compatible formats. This list can be used to calculate the highest bandwidth video with which the display is compatible. Likewise, The EDID of a video distribution system component (other than a display) provides the list of compatible formats. This list can be used to calculate the highest bandwidth video with which the video distribution system component is compatible.

In operation, to dynamically determine the video formats (bandwidths) that are compatible with the video distribution system, and the level of compression required to transmit a source video signal to one or more displays, the bandwidth limitation of the video distribution system (excluding displays) and bandwidth requirements of the one or more displays must both be determined. The CPU 112 of the switcher 106 reads the EDID of all the downstream displays that need to receive the same video from the video source 102 connected to the transmitter 104 (Step 902), and determines the bandwidths supported by each of the displays (Step 904). The CPU 112 then determines the highest common bandwidth for the displays (DHCB) (Step 906). If any of the displays are driven by scalers, those display's EDIDs are excluded from the DHCB calculation because the scaler will scale the image accordingly based on the display's EDID thereby isolating the display's limitation from the system. The scaler's input capability/bandwidth is included in the highest common bandwidth for the system calculation described below.

The highest common bandwidth for the system (SHCB) based on the configuration of the physical transmission layers and the given video signal path. The CPU 112 reads the EDID of all components (excluding displays) in the video signal path (Step 908), and then determines the bandwidths supported by each of the components (Step 910). The CPU 112 next determines highest common bandwidth for the system (SHCB) (Step 912). The SHCB is dependent on the capability/bandwidth of the individual components that make up the video distribution system, such as switchers, HDMI input cards, a multimode fiber output cards, HDBaseT output cards, scalers, repeaters, HDBaseT receivers, fiber optic cables, copper wire, etc.

The CPU 112 then compares the SHCB to the DHCB (step 914). If the SHCB is equal or greater than the DHCB there is no transmission bottleneck and therefore no compression is needed (Step 916). The EDID of the transmitter 104 is then modified by the transmitter CPU 228 to indicate that the maximum bandwidth supported by the transmitter 104 is the same as the DHCB (Step 918). This forces the video source 102 to send a video bandwidth less than or equal to the DHCB. The transmitter CPU 228 then toggles the hot plug signal of the transmitter 104 to force the video source 102 to re-read the EDID of the transmitter 104 and start a video session.

If the SHCB is less than the DHCB, there is a transmission bottleneck in the system and compression is required. The switcher CPU 112 sets bit seven of the manufacturers specific EDID byte in the EDID of the switcher 106 to indicate that the transmitter 104 needs to turn on compression, and sets the remaining bits 6:0 to indicate the compression ratio (e.g., 2:1, 4:1) (Step 920). The EDID of the transmitter 104 is then modified by the transmitter CPU 228 to indicate that the maximum bandwidth supported by the transmitter 104 is the same as the DHCB (Step 922). The CPU 112 then toggles the hot plug signal of the switcher 106 to force the transmitter 104 to re-read the EDID of the switcher 106 and thereby force the transmitter 104 to turn on compression. The transmitter CPU 228 then toggles the hot plug signal of the transmitter 104 to force the video source 102 to re-read the EDID of the transmitter 104 and start a video session.

In another embodiment, as previously mentioned, the algorithm described above for dynamically determining the formats that are compatible with the video distribution system and the level of compression required, if any, is executed by, and stored in memory registers in, the transmitter CPU 228. In other words, in this embodiment, a switcher is not required.

As described above, if a source video format is compatible with the connected downstream devices, then the source video will pass through both the decoder device and encoder device in the same format as the original source video. In various embodiments, a bypass is be inserted in various places in the video signal processing chain, including an input to output multiplexor that will bypass all internal processing. This bypass capability provides backwards compatibility with existing equipment and thus allows for a mix of old and new equipment to be installed. Only sources and displays that utilize the high bandwidth video need the disclosed devices (i.e., transmitter and receiver) in the video signal path. Older source transmitters will be able to send content to new decompression capable receivers. New transmitters will be able to send legacy compatible source material to older receivers.

In another embodiment, the transmitter and receiver are combined into a single transceiver device that is capable of being used at both the source and sink sides of the video distribution chain. One device could be on the compression side, and an identical device could be used on the decompression side. By examining the incoming stream and the capabilities of the attached downstream device the transceiver can determine what to do. It would also be possible to have a device decompress an incoming stream and then re-compress it if necessary to send it on to the next device in the chain.

In still another embodiment, the disclosed transmitter and/or receiver can be implemented as standalone devices with digital video input and output connectors. For example, a device could be made with an input HDMI connector and an output HDMI connector. On the source side, the input would be connected to the new high bandwidth source equipment and output to the legacy low bandwidth distribution hardware. On the display side, the input would be connected to the legacy distribution system's output connector, and the output would be connected to the television.

In yet another embodiment, it is also possible to have a plug in device that upgrades a modular system, such as plug in input and output cards. These cards would replace existing old cards and implement the features of the transmitter and/or receiver described above. In still another embodiment, the transmitter could be incorporated into source equipment like a video disc player and the receiver could be incorporated into display equipment like the television.

ALTERNATE EMBODIMENTS

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A video distribution system, comprising:
    a plurality of physical transmission layers;
    a plurality of video links, a first of the plurality of video links being a first of the plurality of physical transmission layers, and a second of the plurality of video links being a second of the physical transmission layers;
    a video signal transmitter comprising:
        a first input port configured for receiving an encrypted uncompressed source video signal that is incompatible with a first of the plurality of video links,
        a decryption transceiver configured for decrypting the encrypted uncompressed source video signal,
        a compressor configured for compressing the decrypted uncompressed source video signal into a compressed video signal having a bandwidth lower than the bandwidth of the uncompressed source video signal,
        a reformatter configured for reformatting the compressed video signal to simulate an uncompressed video signal having a bandwidth lower than the bandwidth of the uncompressed video signal and that is compatible with the first of the plurality of video links, and
        a first output port configured for transmitting the compressed video signal that simulates an uncompressed video signal through the first of the plurality of video links; and
    a video signal receiver comprising:
        a second input port configured for receiving the compressed video signal that simulates an uncompressed video signal,
        a decompressor configured for decompressing the compressed video signal that simulates an uncompressed video signal into a decompressed video signal, and
        a second output port configured for transmitting the decompressed video signal through a second of the plurality of video links.

2. The video distribution system of claim 1, further comprising a video source in communication with the transmitter through a third of the plurality of video links and providing the uncompressed source video signal that is incompatible with the first of the plurality of video links, and one or more displays configured for receiving the decompressed source video through the second of the plurality of video links.

3. The video distribution system of claim 2, further comprising processor and a bidirectional communication link configured for transmitting to the processor supported bandwidths of each of the one or more displays, and supported bandwidths of at least the transmitter and the receiver.

4. The video distribution system of claim 3, wherein the processor is configured for determining the highest common bandwidth for all of the one or more displays, determining the highest common bandwidth for at least the transmitter and receiver, comparing the highest common bandwidth for all of the one or more displays to the highest common bandwidth for at least the transmitter and receiver, and determining the level of compression needed for compressing the uncompressed source video signal based on the comparison.

5. The video distribution system of claim 1, further comprising a switcher in communication with the first of the plurality of video links and in communication with the receiver through a fourth of the plurality of video links.

6. The video distribution system of claim 1, wherein the video signal transmitter further comprises an encryption transceiver configured for encrypting the compressed video signal that simulates an uncompressed video signal before the compressed video signal that simulates an uncompressed video is transmitted through the first of the plurality of video links.

7. The video distribution system of claim 1, wherein the compressed video signal that simulates an uncompressed video signal is encrypted and the video signal receiver further comprises a decryption transceiver configured for decrypting the compressed video signal that simulates an uncompressed video signal before the compressed video signal that simulates an uncompressed video signal is decompressed and reformatted.

8. The video distribution system of claim 7, wherein the video signal receiver further comprises an encryption transceiver configured for encrypting the decompressed source video signal before the decompressed source video signal is transmitted through the second of the plurality of video links.

9. The video distribution system of claim 1, wherein the first of the plurality of physical transmission layers and the second of the plurality of physical transmission layers each employ a different video standard.

10. The video distribution system of claim 1, wherein the transmitter further comprises a decoder configured for decoding the uncompressed source video signal, which is in a first video format, and an encoder for encoding the compressed video signal that simulates an uncompressed video signal into a second video format.

11. A method of transmitting an uncompressed video signal from a video source through a video distribution system that comprises a plurality of video links, a video source, one or more displays, a transmitter, and a receiver, the method comprising:
    receiving, by a transmitter, from a video source, an encrypted uncompressed source video signal that is incompatible with a first of the plurality of video links on a first of a plurality of physical transmission layers;
    decrypting the encrypted uncompressed source video signal;

compressing the decrypted uncompressed source video signal into a compressed video signal having a bandwidth lower than the bandwidth of the uncompressed video signal;

reformatting the compressed video signal to simulate an uncompressed video signal having a bandwidth lower than the bandwidth of the uncompressed source video signal and that is compatible with the first of the plurality of video links transmitting, by the transmitter, the compressed video signal that simulates an uncompressed video signal through the first of the plurality of video links;

receiving, by a receiver, from the transmitter, the compressed video signal that simulates an uncompressed video signal;

decompressing the compressed video signal that simulates an uncompressed video signal into a decompressed video signal; and transmitting, by the receiver, to the one or more displays, the decompressed source video signal through a second of the plurality video links on a second of the plurality of physical transmission layers.

12. The method of claim 11, further comprising encrypting the compressed video signal that simulates an uncompressed video signal before the compressed video signal that simulates an uncompressed video is transmitted through the first of the plurality of video links.

13. The method of claim 11, wherein the compressed video signal that simulates an uncompressed video signal is encrypted, and the method further comprising decrypting the compressed video signal that simulates an uncompressed video signal before the compressed video signal that simulates an uncompressed video signal is decompressed and reformatted.

14. The method of claim 13, further comprising encrypting the decompressed source video signal before the decompressed source video signal is transmitted through the second of the plurality of video links.

15. The method of claim 11, further comprising receiving, through a bidirectional communication link, supported bandwidths of each of the one or more displays and determining the highest common bandwidth for all of the one or more displays.

16. The method of claim 15, further comprising receiving, through the bidirectional communication link, supported bandwidths of at least the transmitter and the receiver, and determining the highest common bandwidth for at least the transmitter and the receiver.

17. The method of claim 16, further comprising comparing the highest common bandwidth for all of the one or more displays to the highest common bandwidth for at least the transmitter and receiver, and determining the level of compression needed for compressing the uncompressed source video signal based on the comparison.

18. The method of claim 11, further comprising decoding the uncompressed source video signal, which is in a first video format, and encoding the compressed video signal that simulates an uncompressed video signal into a second video format.

* * * * *